United States Patent
Xu et al.

(10) Patent No.: US 10,163,000 B2
(45) Date of Patent: Dec. 25, 2018

(54) METHOD AND APPARATUS FOR DETERMINING TYPE OF MOVEMENT OF OBJECT IN VIDEO

(71) Applicant: Samsung Electronics Co., Ltd., Suwon-si (KR)

(72) Inventors: Kuanhong Xu, Beijing (CN); Ya Lu, Beijing (CN); Zhilan Hu, Beijing (CN); Hongwei Zhang, Beijing (CN); Jae-Joon Han, Seoul (KR); Wonjun Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 14/995,633

(22) Filed: Jan. 14, 2016

(65) Prior Publication Data
US 2016/0210502 A1   Jul. 21, 2016

(30) Foreign Application Priority Data

Jan. 14, 2015 (CN) .......................... 2015 1 0017736
Dec. 14, 2015 (KR) ........................ 10-2015-0178354

(51) Int. Cl.
*G06K 9/00* (2006.01)
(52) U.S. Cl.
CPC ................................ *G06K 9/00335* (2013.01)
(58) Field of Classification Search
None
See application file for complete search history.

(56) References Cited

U.S. PATENT DOCUMENTS

| | | | |
|---|---|---|---|
| 7,728,839 B2 | 6/2010 | Yang et al. | |
| 8,532,399 B2 | 9/2013 | Perronnin et al. | |
| 8,755,593 B2 * | 6/2014 | Kim | G06K 9/00335 382/154 |
| 2010/0027845 A1 * | 2/2010 | Kim | G06K 9/00355 382/107 |
| 2011/0255747 A1 * | 10/2011 | Iwasaki | G06K 9/00348 382/103 |
| 2012/0162454 A1 * | 6/2012 | Park | H04N 5/145 348/208.6 |

(Continued)

FOREIGN PATENT DOCUMENTS

| | | |
|---|---|---|
| JP | 2013-16171 A | 1/2013 |
| KR | 10-1296734 B1 | 8/2013 |

(Continued)

OTHER PUBLICATIONS

Karpathy, A. et al., "Large-scale video classification with convolutional neural networks," 2014 IEEE Conference on Computer Vision and Pattern Recognition (CVPR), IEEE, 2014 (8 pages in English).

(Continued)

*Primary Examiner* — Kim Y Vu
*Assistant Examiner* — Molly Delaney
(74) *Attorney, Agent, or Firm* — NSIP Law

(57) ABSTRACT

A method and corresponding apparatus include extracting a movement trajectory feature of an object from an input video. The method and corresponding apparatus also include coding the extracted movement trajectory feature, and determining a type of a movement of the object based on the coded movement trajectory feature.

17 Claims, 8 Drawing Sheets

(56) References Cited

U.S. PATENT DOCUMENTS

2012/0323521 A1* 12/2012 De Foras ................ G06F 3/017
                                                      702/141
2014/0141322 A1   5/2014 Kim
2014/0143183 A1   5/2014 Sigal et al.

FOREIGN PATENT DOCUMENTS

| KR | 10-2013-0134163 A | 12/2013 |
| KR | 10-2014-0045854 A | 4/2014 |
| KR | 10-1394895 B1 | 5/2014 |
| KR | 10-2014-0106362 A | 9/2014 |

OTHER PUBLICATIONS

Le, Q. et al., "Learning hierarchical invariant spatio-temporal features for action recognition with independent subspace analysis," 2011 IEEE Conference on Computer Vision and Pattern Recognition (CVPR), IEEE, 2011 (pp. 3361-3368).

Shi, F. et al., "Sampling strategies for real-time action recognition," 2013 IEEE Conference on Computer Vision and Pattern Recognition (CVPR), IEEE, 2013 (pp. 2595-2602).

Wang, H., "Action recognition with improved trajectories," 2013 IEEE International Conference on Computer Vision (ICCV), IEEE, 2013 (9 pages in English).

* cited by examiner

METHOD AND APPARATUS FOR DETERMINING TYPE OF MOVEMENT OF OBJECT IN VIDEO

CROSS-REFERENCE TO RELATED APPLICATION(S)

This application claims the benefit under 35 USC 119(a) of Chinese Patent Application No. 201510017736.4, filed on Jan. 14, 2015, in the Chinese Patent Office, and Korean Patent Application No. 10-2015-0178354, filed on Dec. 14, 2015, in the Korean Intellectual Property Office, the entire disclosures of which are incorporated herein by reference for all purposes.

BACKGROUND

1. Field

The following description relates to an image processing method and apparatus to determine a type of a movement of an object.

2. Description of Related Art

With the development of wireless media and mobile Internet, videos are shared actively. Numerous amounts of video data are shared and, as a result, the video data need to be automatically classified and processed. In particular, an increasing number of people record and share videos. Thus, technology which automatically identifies and processes a human or a human behavior in a video is needed.

Such technology includes a hierarchical approach. The hierarchical approach divides a video into temporally linked small segments, each representing a single sub-motion, and models sub-motions. The hierarchical approach is effective to express an interaction between human behaviors. However, the hierarchical approach is difficult to include all situations and, as a result, has a relatively low identification accuracy.

The aforementioned technology also includes a single-layered approach. The single-layered approach identifies a human behavior through a relationship between images of frames in a video and adjacent frames of the images. The single-layered approach learns a feature of the human behavior in the video using a method of automatically learning a human feature. Such method may include independent subspace analysis (ISA) or deep learning. However, an entire video including a behavior and a scene is used to train a feature and, as a result, an identification accuracy is relatively low.

A movement trajectory feature-based method is a single-layered method that does not learn an entire video including a behavior and a scene, and has a relatively high identification accuracy. However, the movement trajectory feature-based method requires a large amount of data quantity of a movement trajectory feature and also requires a large amount of memory to build a model. Thus, the movement trajectory feature-based method is not suitable for real-time identification of a type of a movement in mobile video processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method, including: extracting a movement trajectory feature of an object from an input video; coding the extracted movement trajectory feature; and determining a type of a movement of the object based on the coded movement trajectory feature.

The extracting may also include: transforming frames in the input video to comprise different scales; obtaining absolute movement trajectories corresponding to the different scales by tracking movement points from the transformed frames; and extracting the movement trajectory feature from the absolute movement trajectories.

The extracting of the movement trajectory feature from the absolute movement trajectories may include: transforming the absolute movement trajectories to comprise original scales; obtaining a relative movement trajectory by matching the transformed absolute movement trajectories; and obtaining a trajectory descriptor from the relative movement trajectory, wherein the movement trajectory feature may include the relative movement trajectory and the trajectory descriptor.

The method may further include: eliminating, from the movement trajectory feature, an influence of an apparatus used to photograph the input video on the movement trajectory feature.

The coding may include: reducing a dimension of the extracted movement trajectory feature; clustering the dimension-reduced movement trajectory feature; coding the clustered movement trajectory feature using different coding models; normalizing the coded movement trajectory feature; and combining and normalizing the coded movement trajectory feature and the normalized movement trajectory feature.

The reducing may include reducing a linear association with respect to the extracted movement trajectory feature using orthogonal transformation.

The clustering may include clustering the dimension-reduced movement trajectory feature by one of processing a probability density function of the dimension-reduced movement trajectory feature, and clustering the dimension-reduced movement trajectory feature based on a distance between data of the dimension-reduced movement trajectory feature.

The coding models may be configured to code the clustered movement trajectory feature based on a locality of the clustered movement trajectory feature.

The determining may include: sampling an independent component of the coded movement trajectory feature; and determining the type of the movement of the object based on the sampled independent component.

The determining may include: inputting the sampled independent component into a linear classifier node of a classifying model; identifying a leaf node of the classifying model, the leaf node to be reached by the independent component; and determining the type of the movement of the object based on the identified leaf node.

In accordance with an embodiment, there is provided a movement training method, including: sampling a movement trajectory feature of an object in a sample video; training a dimension reducing model using the sampled movement trajectory feature; training a clustering model using the trained dimension reducing model; and training a classifying model using the trained clustering model.

The sampling may include: extracting the movement trajectory feature of the object from the sample video; and sampling the extracted movement trajectory feature.

The dimension reducing model is configured to reduce a linear association with respect to the movement trajectory feature using orthogonal transformation.

The training of the clustering model may include: reducing a dimension of the sampled movement trajectory feature using the trained dimension reducing model; whitening the dimension-reduced movement trajectory feature; and training the clustering model using the whitened movement trajectory feature.

The clustering model may be configured to cluster a dimension-reduced movement trajectory feature by one of processing a probability density function of the dimension-reduced movement trajectory feature, and clustering the dimension-reduced movement trajectory feature based on a distance between data of the dimension-reduced movement trajectory feature.

The training of the classifying model may include: reducing a dimension of the sampled movement trajectory feature using the trained dimension reducing model; clustering the dimension-reduced movement trajectory feature using the trained clustering model; coding the clustered movement trajectory feature using different coding models; and training the classifying model using the coded movement trajectory feature.

In accordance with another embodiment, there is provided an apparatus, including: an extractor configured to extract a movement trajectory feature of an object from an input video; a coder configured to code the movement trajectory feature; and a determiner configured to determine a type of a movement of the object based on the coded movement trajectory feature.

The extractor may include: a scale transformer configured to transform frames in the input video to comprise different scales; a movement point tracker configured to obtain absolute movement trajectories corresponding to the different scales by tracking movement points from the transformed frames; and a movement trajectory feature extractor configured to extract the movement trajectory feature from the absolute movement trajectories.

The coder may include: a dimension reducer configured to reduce a dimension of the movement trajectory feature; a clusterer configured to cluster the dimension-reduced movement trajectory feature; a movement trajectory feature coder configured to code the clustered movement trajectory feature using different coding models; a normalizer configured to normalize the coded movement trajectory feature; and a combiner configured to combine and normalize the coded movement trajectory feature and the normalized movement trajectory feature.

The determiner may include: an independent component sampler configured to sample an independent component of the coded movement trajectory feature; and a movement type determiner configured to determine the type of the movement of the object based on the sampled independent component.

The movement trajectory may be a function between coordinates of a movement trajectory of a current frame and coordinates of a movement trajectory of a previous frame of the input video.

The movement points may be tracked based on a calculation of an optical flow and a predetermined target function.

Other features and aspects will be apparent from the following detailed description, the drawings, and the claims.

Figure 1:
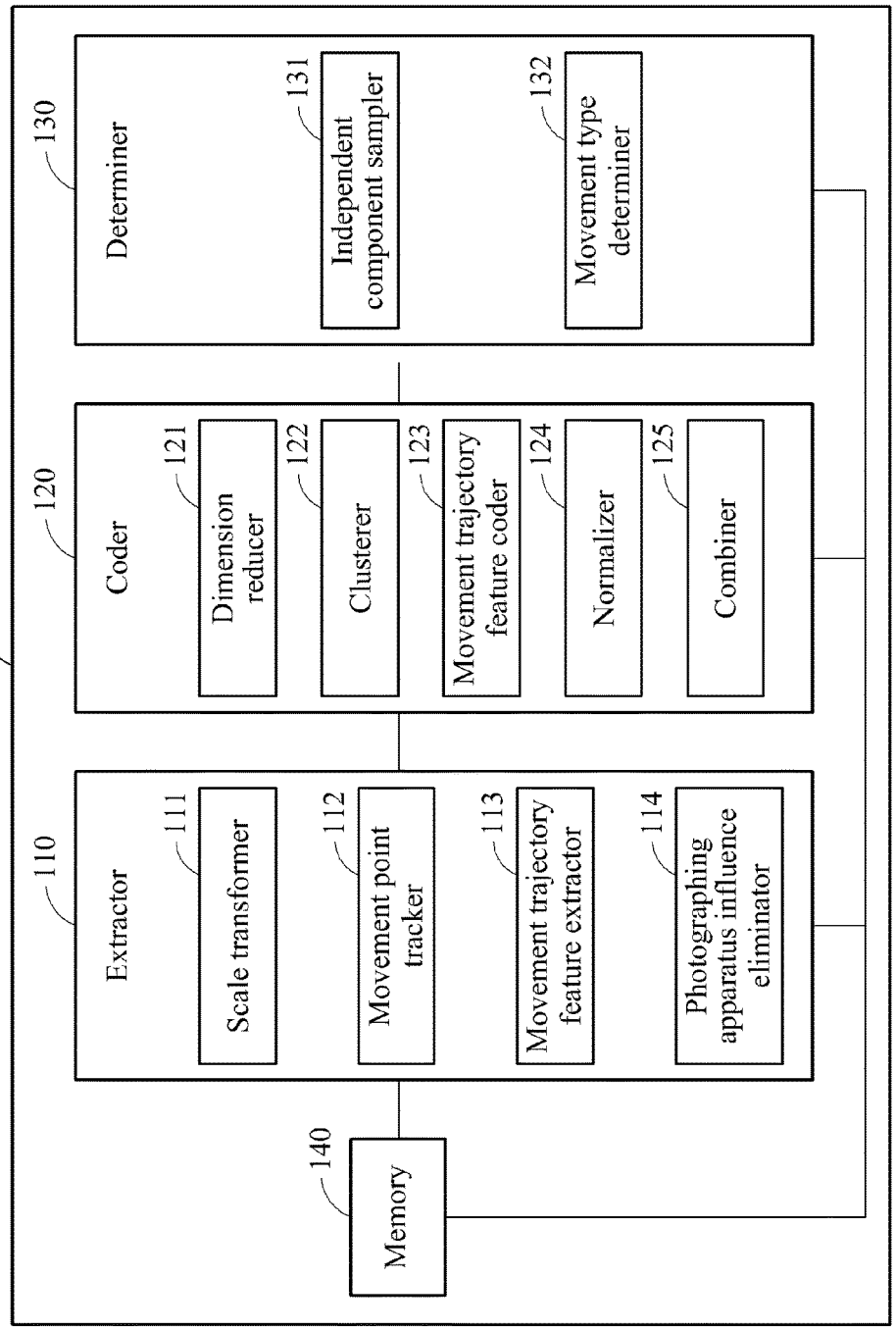
FIG. 1 is a block diagram illustrating an example of an apparatus to determine a type of a movement of an object, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Unless otherwise defined, all terms, including technical terms and scientific terms, used herein have the same meaning as how they are generally understood by those of ordinary skill in the art to which the present disclosure pertains. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the point of the present disclosure, the pertinent detailed description will be omitted. Terms such as "first" and "second" can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Examples set forth hereinafter are applicable to identifying a movement of an object or a human in a video and determining a type of such movement.

FIG. 1 is a block diagram illustrating an example of an apparatus to determine a type of a movement of an object, in accordance with an embodiment.

A determining apparatus 100 to determine a type of a movement of an object, extracts a movement trajectory feature from a plurality of frames in a video. The determining apparatus 100 codes the extracted movement trajectory feature using different coding models, and determines a type of a movement of an object based on the coded movement trajectory feature. By selecting a movement trajectory-based identifying method, an identification accuracy increases.

As an illustrative example, the object includes a human, a moving thing, or an animal, and a movement of the object includes a behavior of the human, a movement of the thing, or a behavior of an animal. An input video refers to a video photographed through a photographing apparatus. The photographing apparatus includes, for example, a camera.

The movement trajectory feature of the object includes a relative movement trajectory and a trajectory descriptor. The trajectory descriptor includes a histogram of gradient (HOG), a histogram of flow (HOF), and a motion boundary histogram (MBH). The trajectory descriptor is deduced or derived from the relative movement trajectory, and the relative movement trajectory is deduced or derived from absolute movement trajectories. The absolute movement trajectories are deduced or derived by tracking movement points.

A movement trajectory is expressed using a single function. For example, the movement trajectory is expressed using a function between coordinates of a movement trajectory of a current frame and coordinates of a movement trajectory of a previous frame. The trajectory descriptor describes the movement trajectory in further detail.

Different types of movements exhibit unique movement trajectory features. Thus, by analyzing the coded movement trajectory feature, a type of a corresponding movement is determined.

Referring to FIG. 1, the determining apparatus 100 includes an extractor 110, a coder 120, a determiner 130, and a memory 140.

The extractor 110 is a processor or a controller configured to extract a movement trajectory feature of an object from an input video. The extractor 110 includes various structural controllers or processors, including, but not limited to a scale transformer 111, a movement point tracker 112, a movement trajectory feature extractor 113, and a photographing apparatus influence eliminator 114.

The scale transformer 111 transforms a plurality of frames included in the input video to have different scales. In an example, the scales are also referred to as sizes.

The movement point tracker 112 obtains absolute movement trajectories corresponding to the scales by tracking movement points from the transformed plurality of frames corresponding to the scales. The movement points are tracked based on a calculation of an optical flow and a predetermined target function.

The movement trajectory feature extractor 113 extracts a movement trajectory feature from the absolute movement trajectories. The movement trajectory feature includes sufficient information related to a movement of an object. Thus, by determining a type of the movement of the object based on the movement trajectory feature, an accuracy to identify the type of movement of the object increases.

The photographing apparatus influence eliminator 114 eliminates, from the movement trajectory feature, an influence of an apparatus, such as a camera or a mobile device, used to photograph the input video on the movement trajectory feature using a predetermined scheme. The influence of the camera includes, a quality of the sensor in the apparatus, an image processor of the camera, or optics. Thus, the accuracy for identification of the type of the movement increases.

The coder 120 codes the extracted movement trajectory feature using different coding models. The coder 120 includes a dimension reducer 121, a clusterer 122, a trajectory feature coder 123, a normalizer 124, and a combiner 125.

The dimension reducer 121 reduces a dimension of the extracted movement trajectory feature to reduce an amount of data to be processed. In other words, in response to the reduction in the dimension of the movement trajectory feature, the amount of the data to be processed is reduced. Thus, a rate of determining a type of a movement increases.

The clusterer 122 clusters the dimension-reduced movement trajectory feature. Through clustering, movement trajectory features having similar characteristics are clustered. The trajectory feature coder 123 codes the movement trajectory feature clustered using different clustering models. The coder 123 provides a plurality of different coding models.

Coding of a trajectory feature describes a state of distribution in a space and a time of the feature using a predetermined rule. In a case in which a single coding scheme is used, the state of distribution is described by only one rule. However, the determining apparatus 100 describes the state of distribution of the movement trajectory feature using various types of coding schemes more effectively, thereby increasing the identification accuracy.

The normalizer 124 normalizes the coded movement trajectory feature. The combiner 125 combines the normalized movement trajectory feature and renormalizes the combined movement trajectory feature. The normalization and the renormalization of the combined movement trajectory feature, the identification accuracy of the determining apparatus 100 increases.

The determiner 130 determines a type of a movement of the object based on the coded movement trajectory feature. The determiner 130 includes an independent component sampler 131 and a movement type determiner 132.

The independent component sampler 131 samples an independent component of the movement trajectory feature. The independent component sampler 131 samples the independent component of the movement trajectory feature using a random sampling scheme to reduce an amount of data to be processed.

The movement type determiner 132 determines the type of the movement using a pre-trained classifying model. The pre-trained classifying model is a model that predicts a value of a target variable based on an input variable. When compared to a support vector machine (SVM), the determining apparatus 100 requires a memory space 99% less than that required by the SVM, while maintaining a similar identification accuracy.

Although FIG. 1 illustrates the extractor 110, the coder 120, and the determiner 130 and each of their corresponding structural processors or elements, as previously described, as individual processors within the determining apparatus 100, a person of ordinary skill in the relevant art will appreciate that each of the structural elements illustrated in FIG. 1 may be combined, in one embodiment, into a single structural processor or element and, in an alternative embodiment, into two or more structural processors.

Figure 2:
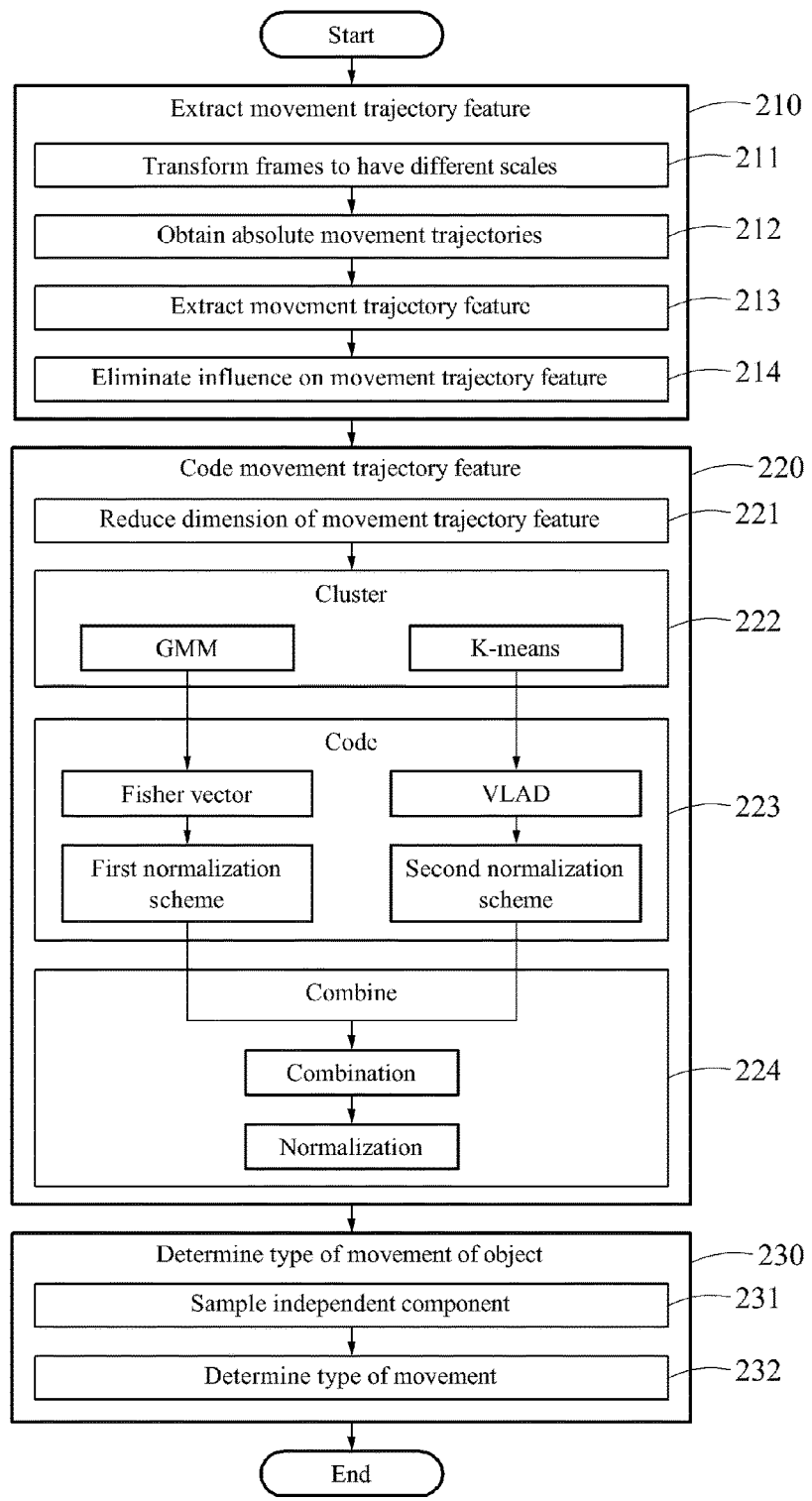
FIG. 2 is a flowchart illustrating an example of a method to determine a type of a movement of an object, in accordance with an embodiment.

FIG. 2 is a flowchart illustrating an example of a method to determine a type of a movement of an object, in accordance with an embodiment.

Referring to FIG. 2, in operation 210, the extractor 110 extracts a movement trajectory feature of an object from an input video.

In operation 211, the scale transformer 111 transforms a plurality of frames included in the input video to have different scales.

The input video includes the plurality of frames arranged based on a flow of time. The scale transformer 111 transforms each frame by expanding or reducing a scale of the corresponding frame using a predetermined transformation scheme. The transformation scheme includes, for example, Laplace pyramid transform.

In operation 212, the movement point tracker 112 obtains absolute movement trajectories corresponding to the scales by tracking movement points from each of the transformed frames.

The movement point tracker 112 tracks the movement points from the transformed frames having the same scales. The transformed frames having the same scales are arranged based on a flow of time. The movement point tracker 112 calculates an optical flow from the plurality of frames based on the flow of time. The movement point tracker 112 samples the optical flow.

The movement point tracker 112 tracks the movement points from the sampled optical flow using a predetermined target function. The movement point tracker 112 extracts absolute movement trajectories from the tracked movement points using a feature point extracting scheme.

In operation 213, the movement trajectory feature extractor 113 extracts a movement trajectory feature from the absolute movement trajectories. The movement trajectory feature extractor 113 deduces a relative movement trajectory from the absolute movement trajectories using a feature matching method.

The movement trajectory feature extractor 113 extracts a trajectory descriptor from the relative movement trajectory, in a predetermined region, including the relative movement trajectory. The trajectory descriptor includes an HOG, an HOF, and an MBH. The determining apparatus 100 transmits more information related to a movement using a feature-based method to achieve a relatively high identification accuracy.

In operation 214, using a predetermined scheme, the photographing apparatus influence eliminator 114 eliminates from the movement trajectory feature external factors produced by the apparatus used to photograph the input video on the movement trajectory feature. As previously discussed, the external factors that may negatively affect the movement trajectory feature include, the sensor, the image processor, and the lenses. The scheme is a scheme of iteratively predicting factors of a mathematical model from a data set including false information. The scheme includes a non-deterministic algorithm, for example, random sample consensus (RANSAC).

In operation 220, the coder 120 codes the movement trajectory feature.

In operation 221, the dimension reducer 121 reduces a dimension of the movement trajectory feature. In general, a movement trajectory in a video is complex and, as a result, an extracted movement trajectory feature is a high-dimensional vector. Accordingly, the dimension reducer 121 reduces the dimension of the movement trajectory feature using a dimension reducing model before coding is performed to reduce a computational complexity for a following coding process.

The dimension reducer 121 reduces a dimension with respect to each of the relative movement trajectory and the trajectory descriptor forming the movement trajectory feature. The dimension reducer 121 reduces the dimension of the movement trajectory feature using the dimension reducing model, which reduces a linear association with respect to the movement trajectory feature using orthogonal transformation. For example, the aforementioned scheme includes a principal component analysis (PCA). Accordingly, the determining apparatus 100 reduces an amount of data of the movement trajectory feature and noise.

In general, the PCA maintains a low-dimensional, for example, low-order, principal component, and reduces a dimension of a high-dimensional, for example high-order, principal component. Because the low-order principal component includes the most significant aspect of data, the low-order principal component is maintained as is or unchanged. Also, the high-order principal component includes a less significant aspect of data. Accordingly, through dimension reduction, the overall amount of data is reduced. In an embodiment, the dimension of the movement trajectory feature is reduced using a pre-trained PCA model. In this example, the dimension of the entire feature data is reduced while the significant aspect of the feature data is maintained. In other words, valid feature information of an absolute portion is maintained.

Figure 6:
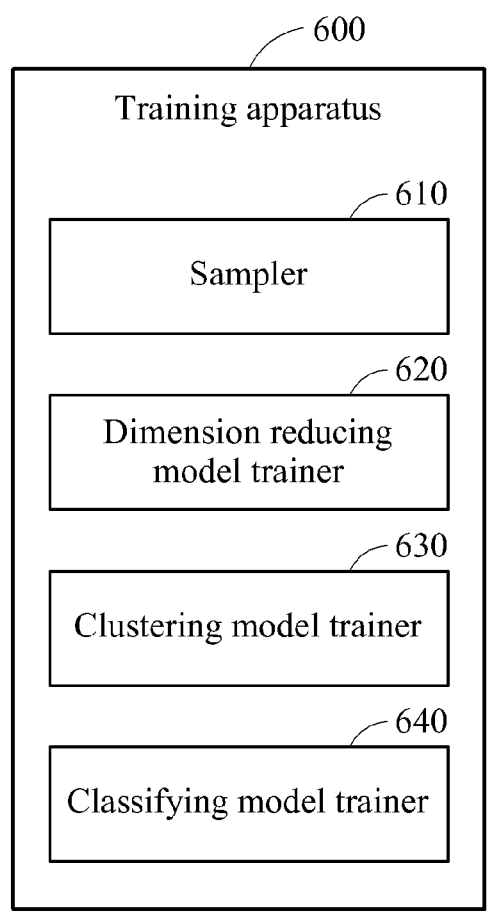
FIG. 6 is a block diagram illustrating an example of a training apparatus to determine a type of a movement of an object, in accordance with an embodiment.

The dimension reducing model is pre-trained by a training apparatus 600 of FIG. 6.

In operation 222, the clusterer 122 clusters the dimension-reduced movement trajectory feature using a clustering model. The clusterer 122 clusters the dimension-reduced movement trajectory feature using or processing a probability density function of the dimension-reduced movement trajectory feature. For example, the clusterer 122 uses a Gaussian mixture model (GMM). The clusterer 122 clusters the dimension-reduced movement trajectory feature based on a distance between data of the dimension-reduced movement trajectory feature. For example, the clusterer 122 clusters the dimension-reduced movement trajectory feature using a K-means model. The clusterer 122 clusters the dimension-reduced movement trajectory feature using different clustering models.

The clustering model is pre-trained by the training apparatus 600 of FIG. 6.

In operation 223, the trajectory feature coder 123 codes the clustered movement trajectory feature using different coding models. The coding models are used to code the clustered movement trajectory feature based on a locality of the clustered movement trajectory feature. For example, the coding models include a fisher vector coding model and a vector of local aggregated descriptor (VLAD) coding model. The determining apparatus 100 obtains a more effective coding result by combining a plurality of coding models. However, the coding models are not limited thereto. In an alternative example, the movement trajectory feature is coded using a bag of features (BoF) coding scheme.

The movement trajectory feature includes the relative movement trajectory, the HOG, the HOF, and the MBH. Thus, the trajectory feature coder 123 codes the relative movement trajectory, the HOG, the HOF, and the MBH using different coding models.

In operation 223, the normalizer 124 normalizes the coded movement trajectory feature using a combination of a plurality of normalization schemes. Different normalization schemes are applied to the coded movement trajectory feature.

For instance, the normalizer 124 normalizes the coded movement trajectory feature by combining an L2 normalization and an intra normalization. In an example, the normalizer 124 uses the L2 normalization or a combination of the intra normalization and the L2 normalization as a first normalization scheme. The normalizer 124 uses a combination of the intra normalization and the L2 normalization as a second normalization scheme.

The L2 normalization uses Equation 1.

$$\|x_{k11}\|^2 + \|x_{k12}\|^2 + \ldots + \|x_{k1n}\|^2 + \ldots + \|x_{km1}\|^2 + \|x_{km2}\|^2 + \ldots + \|x_{kmn}\|^2 = 1 \quad \text{[Equation 1]}$$

In Equation 1, $x_{kmn}$ denotes N values of an m-th sub-component.

The intra normalization uses Equation 2.

$$\frac{\|x_{k11}\|^2 + \|x_{k12}\|^2 + \ldots + \|x_{k1n}\|^2}{1} + \ldots + \frac{\|x_{km1}\|^2 + \|x_{km2}\|^2 + \ldots + \|x_{kmn}\|^2}{1} \quad \text{[Equation 2]}$$

The intra normalization is a scheme to perform normalization using the L2 normalization with respect to each sub-component.

In operation 224, the combiner 125 combines the coded and normalized movement trajectory feature. The normalizer 124 renormalizes the combined movement trajectory feature using the L2 normalization or the intra normalization.

For example, the determining apparatus 100 performs operations 222 and 223 using the GMM, the fisher vector coding model, and the first normalization scheme and outputs a first result indicative thereof. Also, the determining apparatus 100 performs operations 222 and 223 using the K-means model, the VLAD coding model, and the second normalization scheme and outputs a second result indicative thereof. The determining apparatus 100 combines the first and the second results, and renormalizes the combined results.

By normalizing the coded movement trajectory feature, an influence of a strong component of the coded movement trajectory feature on a classifying result of operation 230 is effectively alleviated to increase an accuracy of determining a type of a movement.

In operation 230, the determiner 130 determines a type of a movement of the object based on the coded movement trajectory feature.

In operation 231, the independent component sampler 131 samples an independent component of the coded movement trajectory feature using a sampling scheme. The coded movement trajectory feature is vector data including a plurality of independent components. The sampling scheme is a random sampling scheme. The sampling is performed to reduce an amount of data to be processed by the movement type determiner 132.

When determining the type of the movement based on the coded movement trajectory feature, random sampling is performed with respect to the independent component of the movement trajectory feature and at least one independent component is randomly obtained. For instance, a number of independent components to be sampled is autonomously set based on an actual situation of a user. Herein, the number of independent components to be sampled is not limited to a specific number. In one example, the number of independent components sample may be any number greater than two. Also, the number of independent components may be pre-set during manufacturing or assembly of the determining apparatus 100 or may be dynamically set during the operation of the determining apparatus 100 or by the user during operation.

In operation 232, the movement type determiner 132 determines the type of the movement of the object based on the sampled independent component. The movement type determiner 132 determines the type of the movement of the object using a classifying model, which predicts a value of a target variable based on an input variable. For example, the classifying model may be a discriminative random tree (DRT) model.

The classifying model is pre-trained by the training apparatus 600 of FIG. 6.

Figure 3:
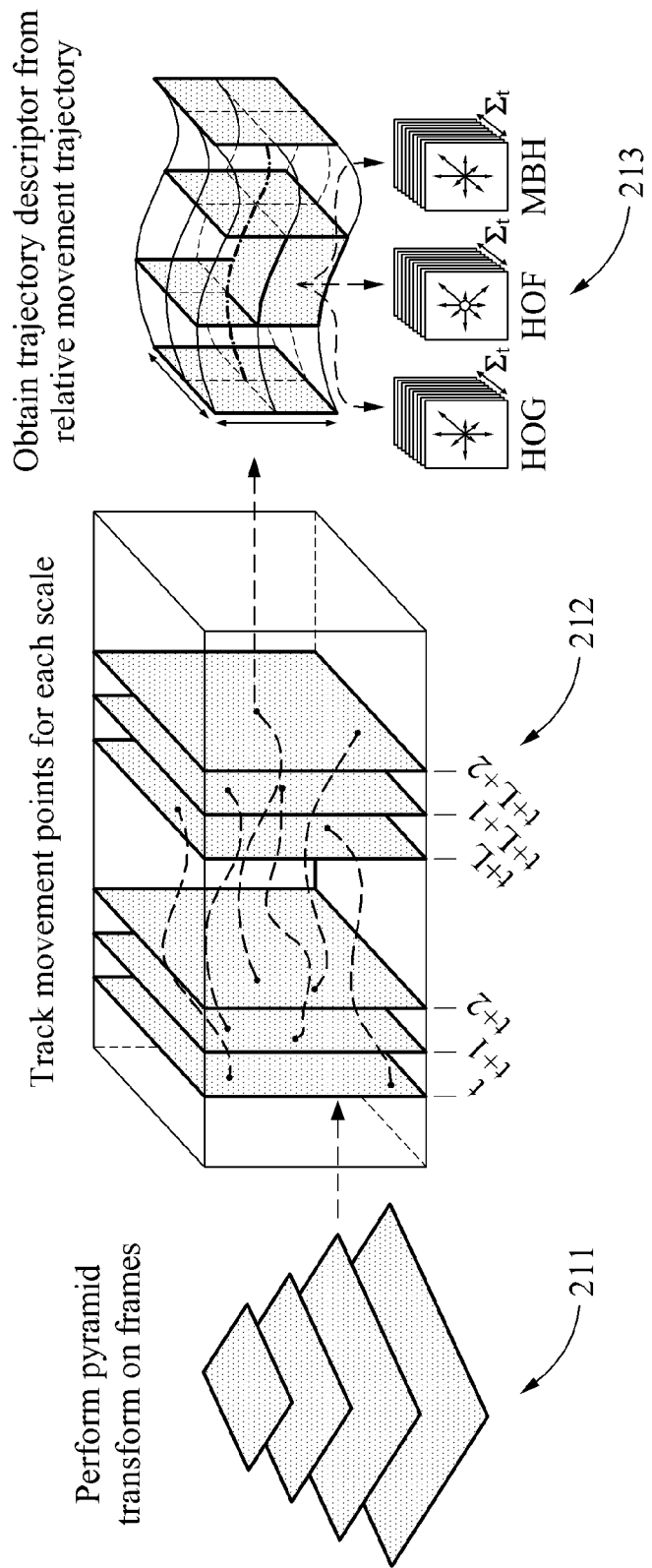
FIG. 3 illustrates an example of an operation to extract a movement trajectory feature of an object, in accordance with an embodiment.

FIG. 3 illustrates an example of an operation to extract a movement trajectory feature of an object, in accordance with an embodiment.

In operation 211, the scale transformer 111 performs Laplace pyramid transform with respect to a plurality of frames in an input video. The scale transformer 111 transforms the frames to have a plurality of scales differing from original scales using the Laplace pyramid transform. In an example, the scale transformer 111 transforms the frames to have scales that differ from each other by a predetermined ratio or a predetermined difference.

In operation 212, the movement point tracker 112 tracks movement points from the plurality of frames having the same scales. The movement point tracker 112 extracts at least one optical flow from the plurality of frames arranged based on a flow of time.

The movement point tracker 112 samples the optical flow based on a spatial proximity. The movement point tracker 112 performs dense sampling with respect to the extracted at least one optical flow.

The movement point tracker 112 tracks movement points from the sampled optical flow using a predetermined target function. For example, the target function is expressed by Equation 3.

$$P_{t+1}=(x_{t+1},y_{t+1})=(x_t,y_t)+(M*\omega)|_{(\bar{x}_t,\bar{y}_t)} \quad [\text{Equation 3}]$$

In Equation 3, $P_{t+1}=(x_{t+1}, y_{t+1})$ denotes coordinates of a trajectory in a subsequent frame having a predetermined scale, and $(x_t, y_t)$ denotes coordinates of a current frame having the same scale. M denotes a kernel function of a median filter, and $\omega$ denotes an optical flow. $(\bar{x}_t,\bar{y}_t)$ denotes mean values of coordinates of a movement trajectory.

The movement point tracker 112 extracts absolute movement trajectories from the tracked movement points using a feature point extracting scheme. For example, the movement point tracker 112 extracts the absolute movement trajectories from the tracked movement points using a speeded up robust features (SURF) scheme.

In operation 213, the movement trajectory feature extractor 113 deduces a relative movement trajectory from the absolute movement trajectories using a feature matching method. In an example, the movement trajectory feature extractor 113 transforms the absolute movement trajectories to have original scales. The movement trajectory feature extractor 113 obtains the relative movement trajectory by matching the transformed absolute movement trajectories.

The movement trajectory feature extractor 113 extracts a trajectory descriptor from the relative movement trajectory in a predetermined region including the relative movement trajectory. The trajectory descriptor includes an HOG, an HOF, and an MBH.

Figure 4:
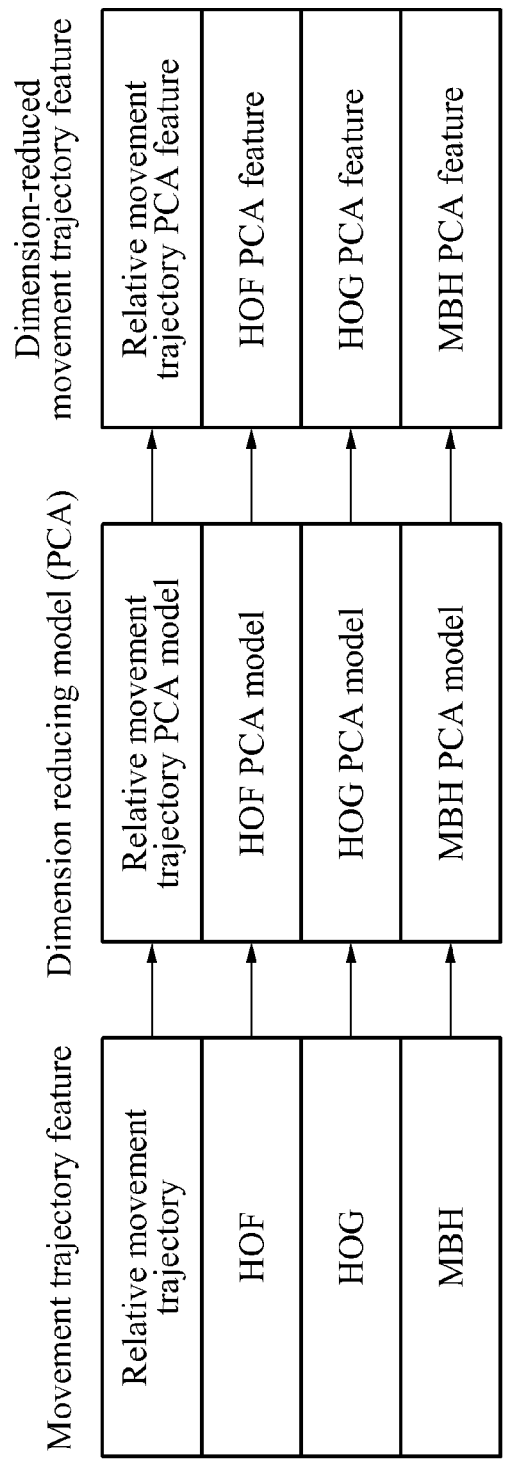
FIG. 4 illustrates an example of an operation to reduce a dimension of a movement trajectory feature using a principal component analysis (PCA) model, in accordance with an embodiment.

FIG. 4 illustrates an example of an operation to reduce a dimension of a movement trajectory feature using a PCA model, in accordance with an embodiment.

The dimension reducer 121 reduces a dimension of a movement trajectory feature using a PCA model. In other words, the dimension reducer 121 reduces the dimension of the movement trajectory feature by reducing a linear association with respect to the movement trajectory feature using the PCA model. The movement trajectory feature includes a relative movement trajectory, an HOF, an HOG, and an MBH. By reducing the dimension of the movement trajectory feature, an amount of data to be processed is reduced.

Figure 5:
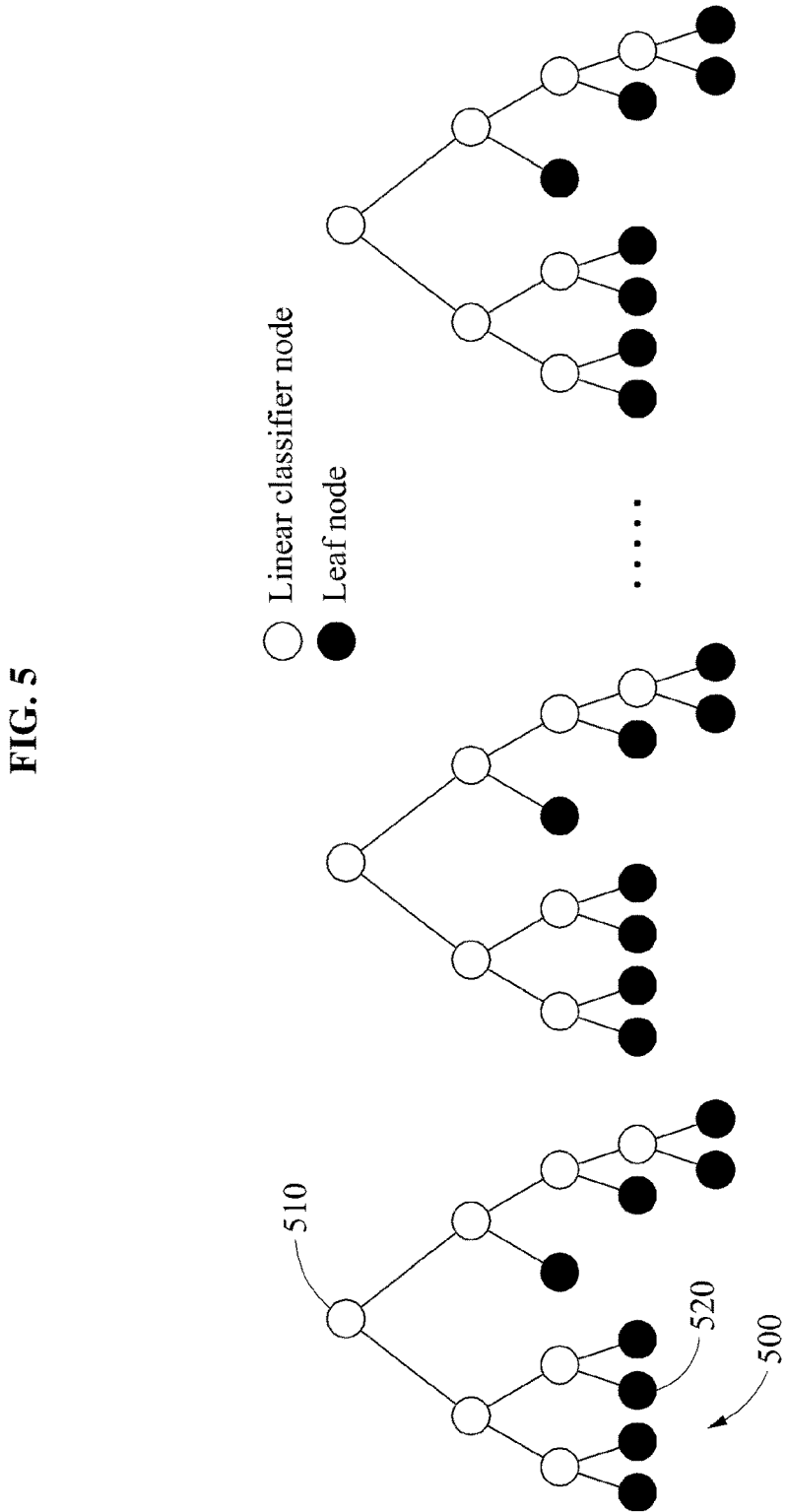
FIG. 5 illustrates an example of an operation to determine a type of a movement of an object based on a movement trajectory feature using a discriminative random tree (DRT) model, in accordance with an embodiment.

FIG. 5 illustrates an example of an operation to determine a type of a movement of an object based on a movement trajectory feature using a DRT model, in accordance with an embodiment.

A DRT includes N independent decision trees 500. Each decision tree 500 includes linear classifier nodes 510 and leaf nodes 520. A linear classifier node 510 acts as a linear classifier. The linear classifier node 510 includes a strong classifier. The strong classifier is provided in a form in which weak classifiers are connected in a cascade manner. For example, the linear classifier node 510 is an SVM. A leaf node 520 corresponds to a type of a movement of an object.

The movement type determiner 132 inputs a sampled independent component into a linear classifier node of each decision tree in the DRT. The independent component is identified for each layer and reaches a leaf node.

The movement type determiner 132 identifies a leaf node to be reached by the sampled independent component in each decision tree and outputs identified results indicative thereof. The movement type determiner 132 aggregates the identified results and determines a type of a movement corresponding to a most identified leaf node. That is, the movement type determiner 132 determines the type of the movement of the object based on the identified leaf node.

FIG. 6 is a block diagram illustrating an example of a training apparatus to determine a type of a movement of an object, in accordance with an embodiment.

The training apparatus 600 trains a dimension reducing model, a clustering model, and a classifying model to be used for the determining apparatus 100 of FIG. 1. By pre-training such models using various samples, an identification accuracy increases. Referring to FIG. 6, the training apparatus 600 includes a sampler 610, a dimension reducing model trainer 620, a clustering model trainer 630, and a classifying model trainer 640.

The sampler 610 samples a movement trajectory feature. The sampler 610 produces a distribution of the movement trajectory feature through unbalanced sampling, and reduces an amount of data.

The dimension reducing model trainer 620, the clustering model trainer 630, and the classifying model trainer 640 input samples of which types are pre-classified into the corresponding models, and correct the models in response to identification accuracies being less than a predetermined level. The dimension reducing model trainer 620, the clustering model trainer 630, and the classifying model trainer 640 iteratively perform the foregoing process, thereby increasing identification accuracies of the models. Although FIG. 6 illustrates the sampler 610, the dimension reducing model trainer 620, the clustering model trainer 630, and the classifying model trainer 640 as individual processors within the training apparatus 600, a person of ordinary skill in the relevant art will appreciate that each of the structural elements illustrated in FIG. 6 may be combined, in one embodiment, into a single structural processor or element and, in an alternative embodiment, into two or three structural processors.

Figure 7:
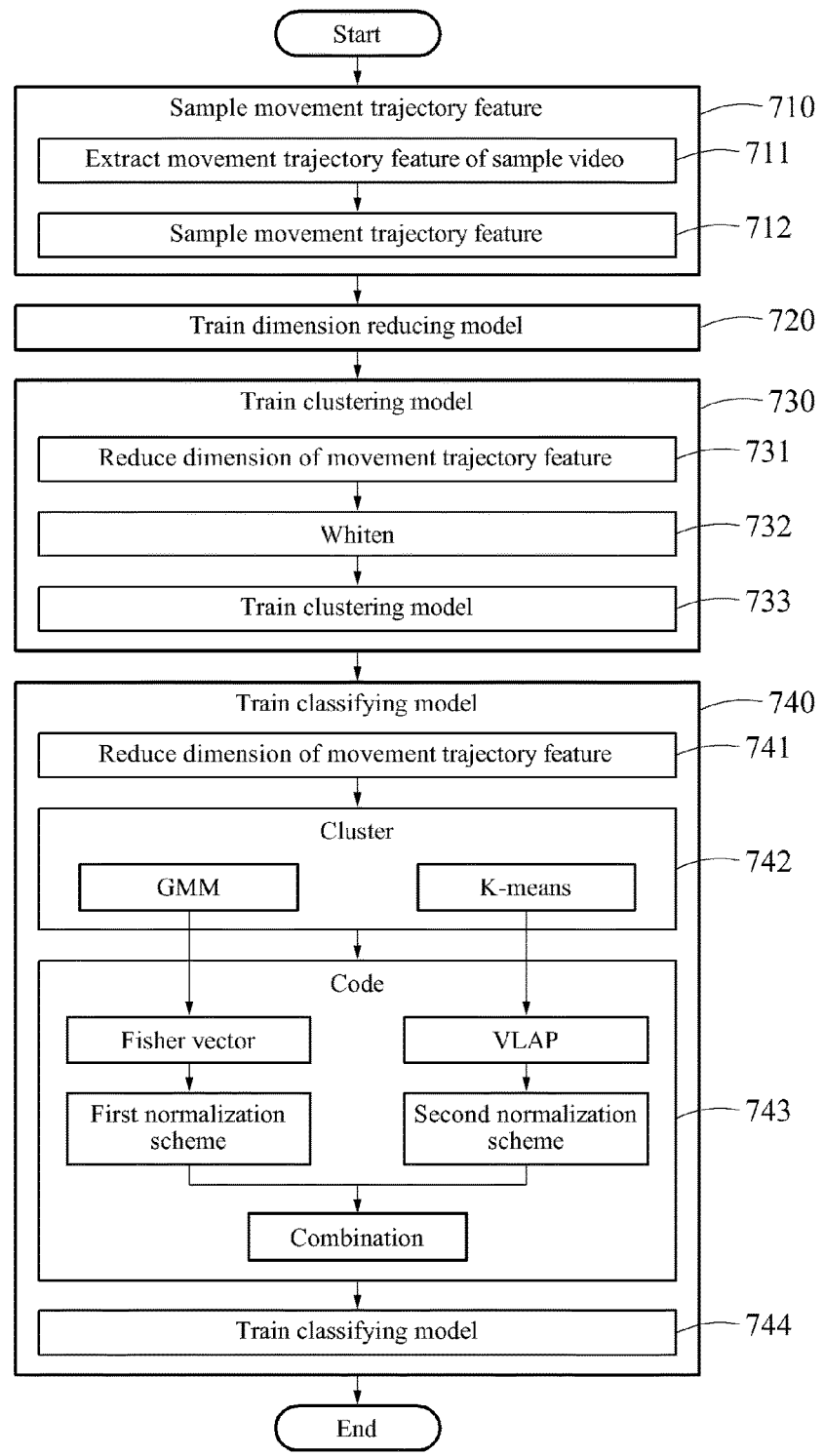
FIG. 7 is a flowchart illustrating an example of a training method to determine a type of a movement of an object, in accordance with an embodiment.

FIG. 7 is a flowchart illustrating an example of a training method to determine a type of a movement of an object, in accordance with an embodiment. The functions of the method of FIG. 7 is described in combination with the structural elements of FIG. 6.

Referring to FIG. 7, in operation 710, the sampler 610 samples a movement trajectory feature of an object in a sample video. The determining apparatus 100 receives the sample video from a sample bank and performs training. The sample bank refers to a storage space configured to store a plurality of sample videos. A large number of videos are stored in the sample bank, and various human behaviors are included in the videos. For example, the sample bank is an international open database, for example, UCF101.

In operation 711, the sampler 610 extracts the movement trajectory feature of the object of the sample video. The sampler 610 deduces absolute movement trajectories by tracking movement points. The sampler 610 obtains a relative movement trajectory by transforming the absolute movement trajectories to have original scales and matching the transformed absolute movement trajectories. The sampler 610 calculates a trajectory descriptor from the relative movement trajectory.

In operation 712, the sampler 610 samples the extracted movement trajectory feature. The sampler 610 samples the extracted movement trajectory feature using a sampling scheme based on a number of movement trajectories. The sampling scheme based on the number of movement trajectories is an unbalanced sampling scheme. The unbalanced sampling scheme is referred to as sparse sampling. The number of movement trajectories refers to a number of extracted movement trajectory features corresponding to the sample video. The unbalanced sampling scheme uses Equation 4.

$$N_i = N_{all} * N_{tr\_i} / N_{tr\_all}$$ [Equation 4]

In Equation 4, $N_i$ denotes a number of sampled movement trajectories of an i-th sample, $N_{all}$ denotes a preset total number of movement trajectories, $N_{tr\_i}$ denotes a number of movement trajectories of the i-th sample, and $N_{tr\_all}$ denotes a number of movement trajectories of all samples. In detail, the sampler 610 samples the extracted movement trajectory feature from the preset total number of movement trajectories in proportion to a ratio of the number of movement trajectories of the i-th sample to the number of movement trajectories of the all samples.

In operation 720, the dimension reducing model trainer 620 trains a dimension reducing model using the sampled movement trajectory feature. The dimension reducing model uses a scheme to reduce a linear association with respect to a movement trajectory feature using orthogonal transformation. For example, the dimension reducing model is a PCA model.

In operation 730, the clustering model trainer 630 trains a clustering model using the trained dimension reducing model. The clustering model trainer 630 prepares samples to be used for training the clustering model. In detail, in operation 731, the clustering model trainer 630 reduces a dimension of the sampled movement trajectory feature using the trained dimension reducing model. In operation 732, the clustering model trainer 630 whitens the dimension-reduced movement trajectory feature. The clustering model trainer 630 reduces a correlation with respect to the dimension-reduced movement trajectory feature through whitening to reduce an amount of data to be processed.

In operation 733, the clustering model trainer 630 trains the clustering model using the whitened movement trajectory feature. The clustering model clusters the movement trajectory feature by using or processing a probability density function of the movement trajectory feature, or clusters the movement trajectory feature based on a distance between data of the trajectory features. For example, the clustering model is a GMM or a K-means model.

In operation 740, the classifying model trainer 640 trains a classifying model using the trained clustering model. The classifying model trainer 640 prepares samples to be used for training before training the classifying model. Operations 741, 742, and 743 correspond to the operation of preparing the samples to be used for training.

In detail, in operation 741, the classifying model trainer 640 reduces a dimension of the sampled movement trajectory feature using the trained dimension reducing model. In operation 742, the classifying model trainer 640 clusters the dimension-reduced movement trajectory feature using the trained clustering model. In operation 743, the classifying model trainer 640 codes and normalizes the clustered movement trajectory feature using different coding models. The classifying model trainer 640 combines the coded movement trajectory feature.

In an embodiment, the classifying model trainer 640 performs operation 741 using the PCA model. The classifying model trainer 640 performs operations 742 and 743 using the GMM, a fisher vector coding model and a first normalization scheme. The classifying model trainer 640 performs operations 742 and 743 using the K-means model, a VLAD coding model, and a second normalization scheme. However, a person of skill in the relevant art will appreciate that the classifying model trainer 640 may perform operations 741 through 743 using alternative coding and normalization models or schemes.

In operation 744, the classifying model trainer 640 trains the classifying model using the coded movement trajectory feature. The classifying model is a model that predicts a value of a target variable based on an input variable. For example, the classifying model is a DRT model.

Figure 8:
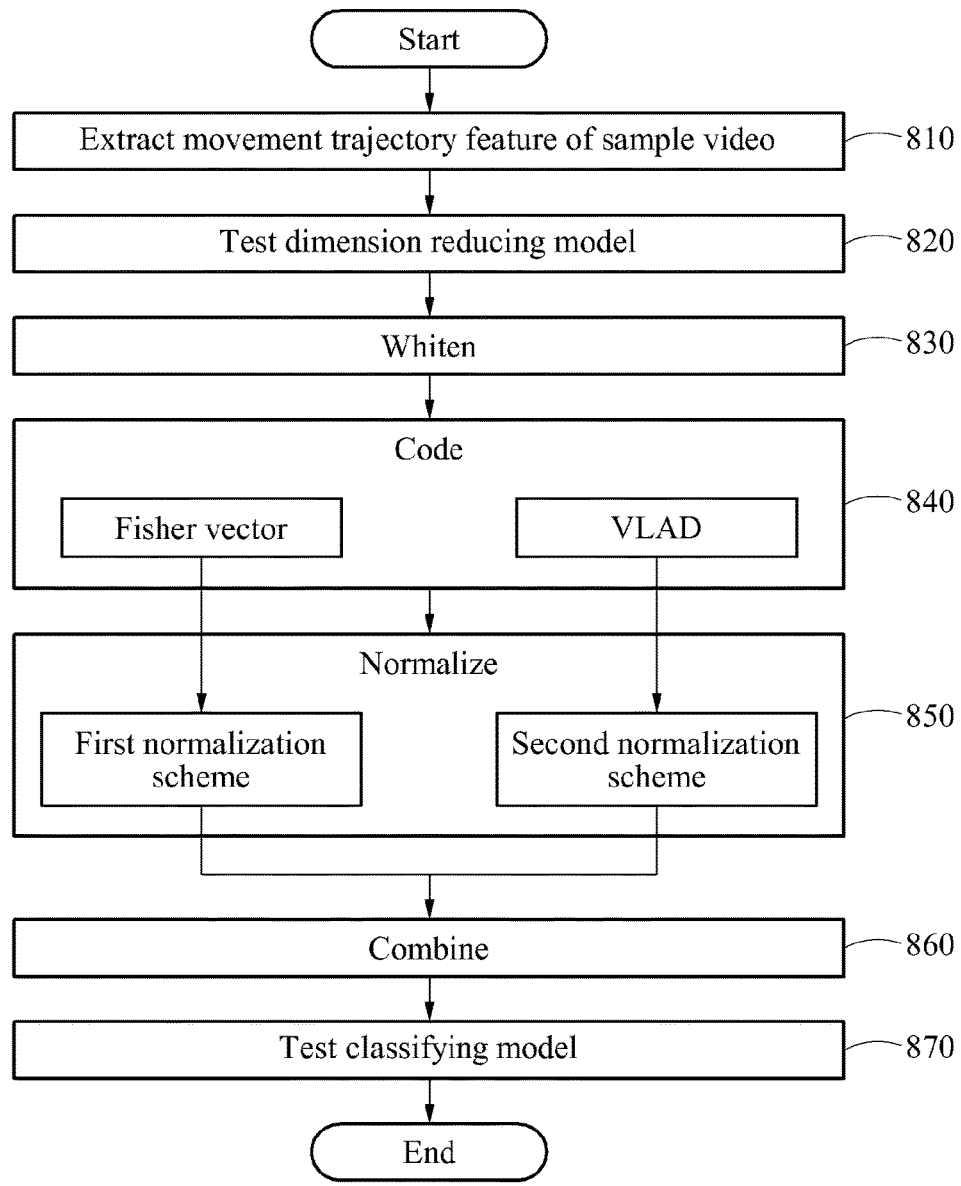
FIG. 8 is a flowchart illustrating an example of a method to test trained object movement type determining models, in accordance with an embodiment.

FIG. 8 is a flowchart illustrating an example of a method to test trained object movement type determining models, in accordance with an embodiment. A test apparatus for determining a type of a movement of an object in a video tests a dimension reducing model and a classifying model, which are trained through the method of FIG. 7.

Referring to FIG. 8, in operation 810 in preparation to test the dimension reducing model, the test apparatus extracts a movement trajectory feature of a sample video. A method of extracting the movement trajectory feature is the same as the method described in operation 210 of FIG. 2. In operation 820, the test apparatus tests the pre-trained dimension reducing model using the extracted movement trajectory feature.

In operation 830, the test apparatus prepares samples to be used to test the classifying model using the dimension-reduced movement trajectory feature. In detail, the test apparatus whitens the dimension-reduced movement trajectory feature. The test apparatus codes, normalizes, and combines the whitened movement trajectory feature.

In an embodiment, in operations 840 and 850, the test apparatus performs the coding and the normalization using different coding models and different normalization schemes. For example, the test apparatus performs the coding and the normalization using a fisher vector coding model and a first normalization scheme. The test apparatus performs the coding and the normalization using a VLAD coding model and a second normalization scheme. In an example, the first normalization scheme includes an L2 normalization, and a combination of an intra normalization and the L2 normalization. The second normalization scheme includes a combination of the intra normalization and the L2 normalization.

In operation 860, the test apparatus combines the coded and normalized movement trajectory feature. In operation 870, the test apparatus tests the classifying model using the combined movement trajectory feature.

According to various embodiments, a relatively high identification accuracy is achieved using a movement trajectory feature-based method as described above with respect to FIGS. 2 and 7-8.

According to various embodiments, an amount of data of a movement trajectory feature and a size of a trained model are reduced by including an effective sampling operation.

According to examples, a relatively high identification accuracy is achieved using different coding models or different normalization schemes together.

The extractor, the coder, the determiner, the transformer, the tracker, the eliminator, the cluster, the normalizer, the combiner, the reducer, the sampler, and the trainer illustrated in FIGS. 1 and 6 that perform the operations described herein with respect to FIGS. 2 and 7-8 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2 and 7-8. The hardware components also access, manipulate, process, create, and store data in response to execution of the instructions or software.

For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 7-8 that perform the operations described herein with respect to FIGS. 1 and 6 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method, comprising:
    transforming frames in an input video to comprise different scales;
    obtaining absolute movement trajectories corresponding to the different scales by tracking movement points from the transformed frames;
    transforming the absolute movement trajectories to comprise original scales;
    obtaining a relative movement trajectory by matching the transformed absolute movement trajectories; and
    obtaining a trajectory descriptor from the relative movement trajectory,
    extracting a movement trajectory feature of an object from the absolute movement trajectories;
    coding the extracted movement trajectory feature;
    determining a type of a movement of the object based on the coded movement trajectory feature;
    wherein the movement trajectory feature comprises the relative movement trajectory and the trajectory descriptor.

2. The method of claim 1, further comprising:
eliminating, from the movement trajectory feature, an influence of an apparatus used to photograph the input video on the movement trajectory feature.

3. A method comprising:
extracting a movement trajectory feature of an object from an input video;
reducing a linear association with respect to the extracted movement trajectory feature using orthogonal transformation;
clustering the reduced movement trajectory feature;
coding the clustered movement trajectory feature using different coding models;
normalizing the coded movement trajectory feature;
combining and normalizing the coded movement trajectory feature and the normalized movement trajectory feature; and
determining a type of a movement of the object based on the combined and normalized movement trajectory feature.

4. The method of claim 3, wherein the clustering comprises clustering the dimension-reduced movement trajectory feature by one of
processing a probability density function of the dimension-reduced movement trajectory feature, and
clustering the dimension-reduced movement trajectory feature based on a distance between data of the dimension-reduced movement trajectory feature.

5. The method of claim 3, wherein the coding models are configured to code the clustered movement trajectory feature based on a locality of the clustered movement trajectory feature.

6. The method of claim 1, wherein the determining comprises:
sampling an independent component of the coded movement trajectory feature; and
determining the type of the movement of the object based on the sampled independent component.

7. The method of claim 6, wherein the determining comprises:
inputting the sampled independent component into a linear classifier node of a classifying model;
identifying a leaf node of the classifying model, the leaf node to be reached by the independent component; and
determining the type of the movement of the object based on the identified leaf node.

8. A movement training method, comprising:
sampling a movement trajectory feature of an object in a sample video;
training a dimension reducing model using the sampled movement trajectory feature;
reducing a dimension of the sampled movement trajectory feature using the trained dimension reducing model;
whitening the dimension-reduced movement trajectory feature;
training a clustering model using the whitened movement trajectory feature; and
training a classifying model using the trained clustering model.

9. The method of claim 8, wherein the sampling comprises:
extracting the movement trajectory feature of the object from the sample video; and
sampling the extracted movement trajectory feature.

10. The method of claim 8, wherein the dimension reducing model is configured to reduce a linear association with respect to the movement trajectory feature using orthogonal transformation.

11. The method of claim 8, wherein the clustering model is configured to cluster a dimension-reduced movement trajectory feature by one of processing a probability density function of the dimension-reduced movement trajectory feature, and clustering the dimension-reduced movement trajectory feature based on a distance between data of the dimension-reduced movement trajectory feature.

12. The method of claim 8, wherein the training of the classifying model comprises:
reducing a dimension of the sampled movement trajectory feature using the trained dimension reducing model;
clustering the dimension-reduced movement trajectory feature using the trained clustering model;
coding the clustered movement trajectory feature using different coding models; and
training the classifying model using the coded movement trajectory feature.

13. An apparatus implemented on one or more processors, comprising:
a scale transformer configured to transform frames in an input video to comprise different scales;
a movement point tracker configured to obtain absolute movement trajectories corresponding to the different scales by tracking movement points from the transformed frames;
a movement trajectory feature extractor configured to
transform the absolute movement trajectories to comprise original scales,
obtain a relative movement trajectory by matching the transformed absolute movement trajectories; and
obtain a trajectory descriptor from the relative movement trajectory, and
extract a movement trajectory feature of an object from the absolute movement trajectories;
a coder configured to code the movement trajectory feature; and
a determiner configured to determine a type of a movement of the object based on the coded movement trajectory feature,
wherein the movement trajectory feature comprises the relative movement trajectory and the trajectory descriptor.

14. The apparatus of claim 13, wherein the coder comprises:
a dimension reducer configured to reduce a dimension of the movement trajectory feature;
a cluster configured to cluster the dimension-reduced movement trajectory feature;
a movement trajectory feature coder configured to code the clustered movement trajectory feature using different coding models;
a normalizer configured to normalize the coded movement trajectory feature; and
a combiner configured to combine and normalize the coded movement trajectory feature and the normalized movement trajectory feature.

15. The apparatus of claim 13, wherein the determiner comprises:
an independent component sampler configured to sample an independent component of the coded movement trajectory feature; and a movement type determiner configured to determine the type of the movement of the object based on the sampled independent component.

16. The apparatus of claim 13, wherein the movement trajectory comprises a function between coordinates of a movement trajectory of a current frame and coordinates of a movement trajectory of a previous frame of the input video.

17. The apparatus of claim 13, wherein the movement points are tracked based on a calculation of an optical flow and a predetermined target function.

* * * * *